(12) United States Patent
Riechel et al.

(10) Patent No.: US 8,595,517 B2
(45) Date of Patent: Nov. 26, 2013

(54) THERMAL MANAGEMENT OF A MOBILE DEVICE WITH VENTLESS HOUSING

(75) Inventors: Patrick S. Riechel, Cambridge, MA (US); Timothy B. Austin, Stony Brook, NY (US); Thomas E. Wulff, North Patchogue, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 244 days.

(21) Appl. No.: 12/873,541

(22) Filed: Sep. 1, 2010

(65) Prior Publication Data
US 2012/0049933 A1 Mar. 1, 2012

(51) Int. Cl.
*G06F 1/00* (2006.01)

(52) U.S. Cl.
USPC .............. 713/300; 361/679.54; 361/679.56; 361/714; 361/718; 702/132

(58) Field of Classification Search
USPC ........ 702/132; 361/714, 718, 679.54, 679.56; 713/300
See application file for complete search history.

(56) References Cited

U.S. PATENT DOCUMENTS

| | | | |
|---|---|---|---|
| 7,376,849 B2 | 5/2008 | Tschanz et al. | |
| 7,620,826 B2 | 11/2009 | Huang et al. | |
| 7,969,730 B1 * | 6/2011 | Doherty et al. | 361/679.54 |
| 8,150,561 B2 * | 4/2012 | Shimotono et al. | 713/322 |
| 2007/0282208 A1 * | 12/2007 | Jacobs et al. | 600/485 |
| 2008/0269954 A1 * | 10/2008 | Lev et al. | 700/299 |
| 2009/0137290 A1 * | 5/2009 | Overmann et al. | 455/575.1 |
| 2011/0301777 A1 * | 12/2011 | Cox et al. | 700/299 |

* cited by examiner

*Primary Examiner* — Albert Wang
(74) *Attorney, Agent, or Firm* — Randi L. Karpinia; Michael J. Giannetta

(57) ABSTRACT

A mobile device includes a housing having a plurality of surfaces. A processor is located within the housing. The processor heats a portion of one or more of the surfaces of the housing. A temperature sensor detects a temperature of the portion of the surface. The rate of energy consumption by the processor is adjusted based on the temperature of the portion of the surface of the housing.

11 Claims, 3 Drawing Sheets

THERMAL MANAGEMENT OF A MOBILE DEVICE WITH VENTLESS HOUSING

TECHNICAL FIELD

The invention relates generally to thermal management of a processor of a mobile device.

BACKGROUND

Due to their relatively small size and complex circuitry, microprocessors tend to generate significant heat. This heat can become problematic when the microprocessor is situated in an enclosure have little or no ventilation. The heat must be controlled or dissipated to prevent damage to the microprocessor and to the surrounding circuitry. Many microprocessors contain heat regulating devices that prevent the microprocessor from overheating.

SUMMARY

In one aspect, the invention is embodied in a mobile device including a housing having a plurality of surfaces. A processor is located within the housing. The processor heats a portion of one or more of the surfaces of the housing. A temperature sensor detects a temperature of the portion of the surface. The rate at which energy is consumed by the processor is adjusted based on the temperature of the portion of the surface of the housing.

In one embodiment, the rate at which energy is consumed by the processor is adjusted by modifying at least one of a duty cycle of the processor, a clock speed of the processor and a voltage supplied to the processor.

In one embodiment, the mobile device includes a second temperature sensor for detecting the temperature of the processor. In one embodiment, a second temperature sensor detects a temperature of a battery electrically coupled to the processor. The portion can correspond to an area of the at least one surface having the highest temperature.

In one embodiment, a control loop continually adjusts the rate at which energy is consumed by the processor based on a thermal characterization of the mobile device. The housing can be substantially sealed. In one embodiment, at least one of the plurality of surfaces is thermally conductive. The thermally conductive surface conducts heat from the processor. In one embodiment, at least one of the plurality of surfaces is substantially thermally insulating.

In another aspect, the invention is embodied in a method including positioning a processor within a housing having a plurality of surfaces. The processor heats a portion of at least one of the plurality of surfaces of the housing. The temperature of the portion is detected. The rate at which energy is consumed by the processor duty is adjusted based on the temperature of the portion.

In one embodiment, the rate at which energy is consumed by the processor is adjusted by modifying at least one of a duty cycle of the processor, a clock speed of the processor and a voltage supplied to the processor.

In one embodiment, method further comprises adjusting the rate at which energy is consumed by the processor based on a temperature of the processor. In one embodiment, the temperature of the processor is detected. In another embodiment, a temperature of a battery electrically coupled to the processor is detected.

In one embodiment, the portion corresponds to an area of the at least one surface having the highest temperature. The method can further include continually adjusting the rate at which energy is consumed by the processor based on a thermal characterization of the mobile device. The housing can be substantially sealed. In one embodiment, heat is conducted from the processor with at least one of the plurality of surfaces.

BRIEF DESCRIPTION OF THE FIGURES

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing FIG. A would refer to an element, 10, shown in a figure other than FIG. A.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description. For the purposes of conciseness, many conventional techniques and principles related to temperature sensing and feedback control, and the like, need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to systems utilizing temperature sensors that monitor the temperature of a housing containing a microprocessor that generates heat. In an exemplary embodiment, the temperature sensor is located on a portion of the housing having the highest measured temperature. The temperature sensor transmits temperature data to the microprocessor which regulates the rate at which energy is consumed by it in response to the temperature data.

Figure 1:
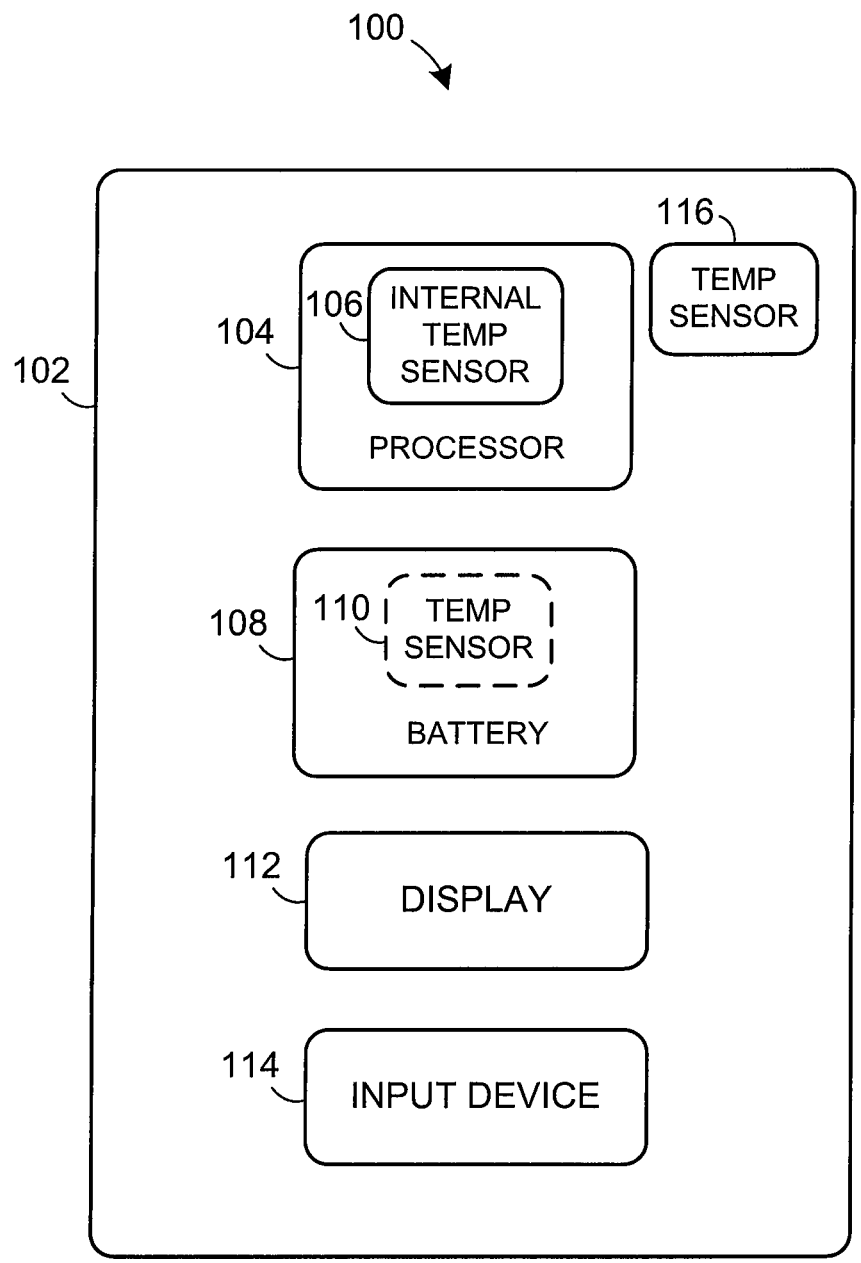
FIG. 1 is a block diagram of mobile device according to one embodiment of the invention.

FIG. 1 is a block diagram of mobile device 100 according to one embodiment of the invention. The mobile device 100 can be a mobile computer, cellular telephone, personal digital assistant, or any portable device including a processor and a battery.

The mobile device 100 includes a housing 102. In one embodiment, the housing 102 can be substantially sealed when the mobile device 100 is assembled. The housing 102 can be fabricated from plastic, metal, or any suitable material. In one embodiment, the housing 102 can be formed from a single piece of material. In other embodiments, the housing 102 is formed from multiple pieces of material assembled together.

A processor 104 is positioned within the housing 102. The processor 104 can be any suitable processor as previous described. The processor 104 can include an internal temperature sensor 106. The internal temperature sensor 106 can monitor the temperature of the processor 104 and cause the processor 104 to either switch off, adjust its clock cycle or to adjust its duty cycle to prevent damage to the processor 104 from overheating.

A battery 108 is positioned in the housing. The battery 108 can be a rechargeable battery, such as a lithium ion battery, metal hydride battery, or nickel cadmium battery. The battery 108 can also be an alkaline battery. The battery 108 can be coupled to an external power source (not shown) for charging. In one embodiment, an optional temperature sensor 110 can be coupled to the battery 108. The optional temperature sensor 110 can monitor the temperature of the battery 108. The processor 104 can be electrically coupled to the optional temperature sensor 110 and receive temperature data related to the temperature of the battery 108.

The mobile device 100 can include additional heat generating components, such as power MOSFETs (not shown). To mitigate the heat generated by such components, the input voltage and/or the duty cycle of the appropriate coupled components can also be controlled using techniques described herein. For example, if the power being drawn by the processor is passed through a MOSFET that is generating excessive heat, the processor's clock frequency can be reduced to mitigate the effect of the heat.

The mobile device 100 can also include a display 112. The display 112 can be any suitable display, such as a liquid crystal display (LCD), a light emitting diode (LED) display, or a laser projection display (LPD). The display 112 can be a touch screen display.

The mobile device 100 can also include an input device 114. The input device 114 can be a keypad, a keyboard, touchpad, a mouse, a trackball, a microphone, or any other suitable input device.

A temperature sensor 116 is thermally coupled to a surface of the housing 102. The temperature sensor 116 can be any suitable temperature measuring device, such as a thermocouple, for example. The temperature sensor 116 is configured to measure a temperature of the portion of the surface to which it is attached. In one embodiment, the temperature sensor 116 is located on the portion of the surface having the highest temperature when the processor 104 is operating. The temperature sensor 116 is electrically coupled to the processor 104.

The processor 104 is configured to receive temperature data from the temperature sensor 116. The rate at which energy is consumed by the processor 104 can be adjusted in response to the temperature data. For example, if the portion of the surface of the housing 102 reaches a certain threshold temperature, the quantity of energy consumed by the processor 104 over time is adjusted by modifying at least one of a duty cycle of the processor 104, a clock speed of the processor 104 and a voltage supplied to the processor 104 until the temperature falls below the threshold.

Skilled artisans will appreciate that by adjusting the duty cycle of the processor 104, the rate of energy consumption of the processor 104 can be modified. For example, the period in which the processor 104 is activated and deactivated can affect the energy consumed by the processor 104.

Skilled artisans will appreciate that by adjusting the clock speed of the processor 104, the rate of energy consumption of the processor 104 can be modified. For example, operating the processor 104 at reduced clock speed can reduce the energy consumed by the processor 104.

Skilled artisans will appreciate that by adjusting the voltage supplied to the processor 104, the rate of energy consumption of the processor 104 can be modified. For example, reducing the voltage available to the processor at any moment in time reduces the energy consumed by the processor 104.

In one embodiment, the temperature data is received by a software program stored in memory (not shown) and executing on the processor 104. The software program can include a feedback control loop that monitors the temperature data and sends commands to the processor 104 to adjust the rate at which energy is consumed by the processor 104.

In one embodiment, the processor 104 includes the internal temperature sensor 106 previously described. The internal temperature sensor 106 measures the internal temperature of the processor 104. The rate at which energy is consumed by the processor 104 can be adjusted based on the internal temperature of the processor 104. The rate at which energy is consumed by the processor 104 is adjusted by modifying at least one of a duty cycle of the processor 104, a clock speed of the processor 104 and a voltage supplied to the processor 104. The internal temperature sensor 106 is configured to prevent damage to the processor 104 due to the processor 104 overheating.

Portions of the housing 102 can still become uncomfortable to touch even though the processor 104 may be operating with a reduced rate of energy consumption in response to data from the internal temperature sensor 106 of the processor 104. For example, surfaces of the housing 102 can conduct heat from the processor 104. In one embodiment, the temperature sensor 116 is located on a portion of a surface of the housing 102 having the highest temperature when the processor 104 is operating.

Alternatively, the rate of energy consumption of the processor 106 can be adjusted based on the internal temperature of the processor 106 and the measured temperature of the portion of the surface of the housing 102. In one embodiment, the temperature of the battery 108 can also be used to adjust the rate of energy consumption of the processor 106.

In operation, the components of the mobile device 100 can be assembled in the housing 102. The mobile device 100 can then be activated. The temperature of portions of the surfaces of the housing 102 can be measured. A thermal characterization of the mobile device 100 can be generated based on the temperature measurements. In one embodiment, the temperature sensor 116 is located at a surface of the housing 102 having the highest temperature when the mobile device 100 is operating. The temperature sensor 116 can be located on an inside surface of the housing 102.

The processor 104 receives data regarding the surface temperature of the housing 102 from the temperature sensor 116. The processor 104 can increase or reduce its rate of energy consumption in response to the data. For example, a predetermined threshold value of the temperature of the surface 106 of the housing 102 can be set. The rate of energy consumption of the processor 104 can be adjusted based on the temperature of the surface relative to the threshold value. The rate at which energy is consumed by the processor 104 can be adjusted by modifying at least one of a duty cycle of the processor 104, a clock speed of the processor 104 and a voltage supplied to the processor 104.

In one embodiment, the temperature sensor 116 continuously feeds data to the processor 104 in a feedback loop. The rate of energy consumption of the processor 104 can be dynamically adjusted as the temperature of the surface of the housing 102 varies.

Figure 2:
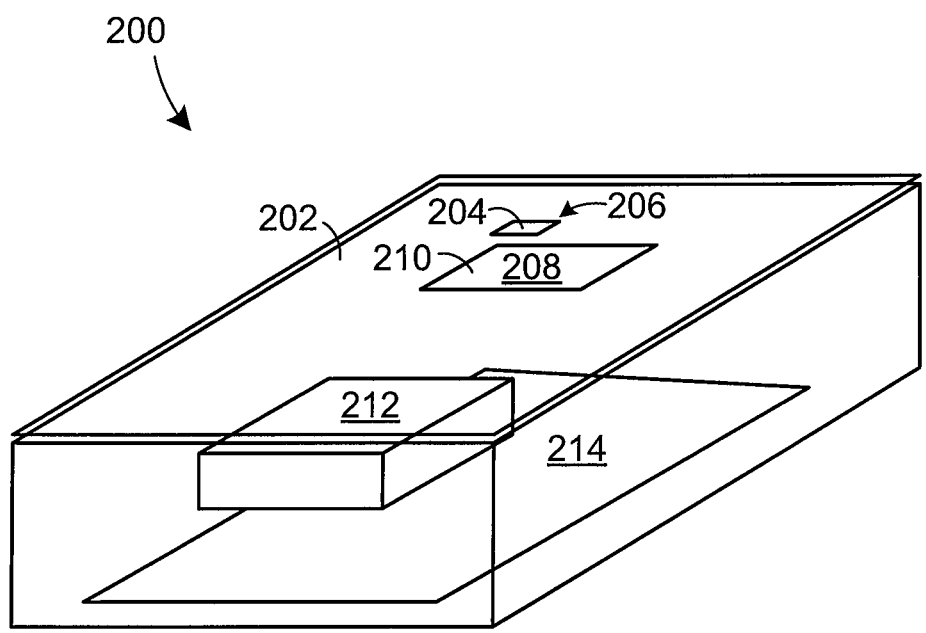
FIG. 2 is a perspective view of a housing of a mobile device according to one embodiment of the invention.

FIG. 2 is a perspective view of a housing 200 of a mobile device 100. The housing 200 includes a surface 202 in which a temperature sensor 204 is located. Specifically, the temperature sensor 204 is positioned on a portion 206 of the surface 202 having the highest temperature when a processor 208 located within the housing 200 is operating.

In one embodiment, the portion 206 of the surface 202 is located adjacent to a top surface 210 of the processor 208. The top surface 210 of the processor 208 conducts heat away from the internal elements of the processor 208.

The surface 202 of the housing 200 can be a thermal conductor that conducts heat away from the processor 208. In one embodiment, one or more surfaces of the housing 200 are thermally insulating and do not conduct a significant quantity of heat.

The housing 200 can also include a battery 108 and a display 112. Besides the processor 208, the battery 108 can also generate heat which increases the temperature of one or more surfaces of the housing 200 as well as the battery 108 itself. For example, lithium ion batteries are susceptible to failure when subjected to high internal temperatures.

The housing 200 can be sealed. For example, the housing 200 can be fabricated without vent holes. In this embodiment, the heat generated by the processor 208 can be thermally conducted to one or more surfaces of the housing 200 and dissipated to the ambient air.

Figure 3:
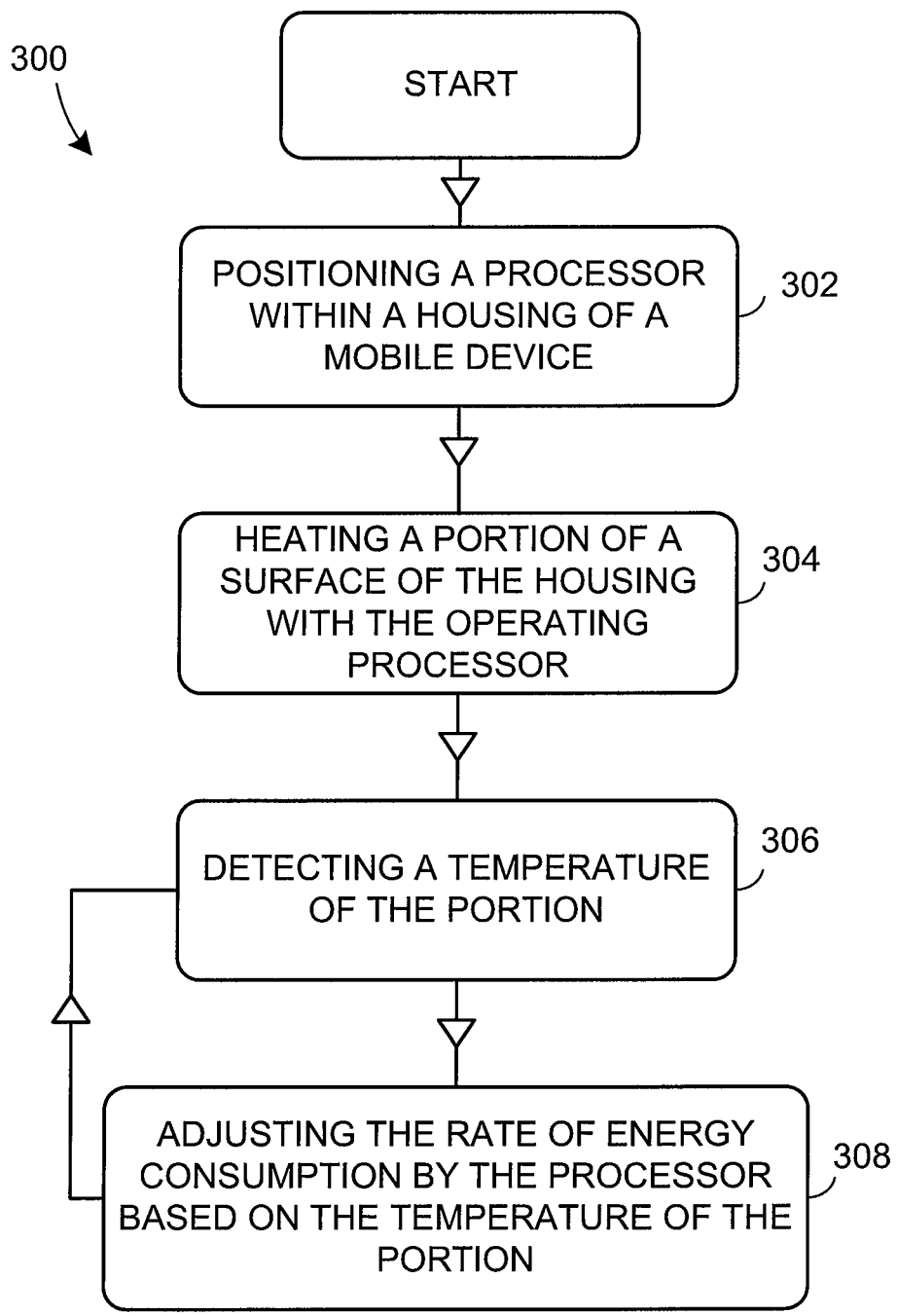
FIG. 3 is a flowchart of a method according to an embodiment of the invention.

FIG. 3 is a flowchart 300 of a method according to an embodiment of the invention. The method includes the step 302 of positioning a processor within a housing of a mobile device. In the next step 304, the processor heats a portion of the surface of the housing. The temperature of the portion is detected in step 306. The rate of energy consumption of the processor is adjusted based on the temperature of the portion in step 308.

In one embodiment, a feedback loop is created to continuously monitor the temperature of the portion and dynamically adjust the rate of energy consumption of the processor 100 (FIG. 1) based on the temperature measurements. The temperature measurements can be compared with a threshold value and the rate of energy consumption of the processor 104 can be increased or decreased depending on the comparison.

In general, the processor 104 includes processing logic configured to carry out the functions, techniques, and processing tasks associated with the operation of the mobile device 100. Furthermore, the steps of a method or algorithm described in connection with the embodiments disclosed herein may be embodied directly in hardware, in firmware, in a software module executed by the processor 104, or any combination thereof. Any such software may be implemented as low level instructions (assembly code, machine code, etc.) or as higher-level interpreted or compiled software code (e.g., C, C++, Objective-C, Java, Python, etc.).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for the near-field wireless device pairing described herein. The non-processor circuits may include, but are not limited to, a radio receiver, a radio transmitter, signal drivers, clock circuits, power source circuits, and user input devices. As such, these functions may be interpreted as steps of a method to perform the near-field wireless device pairing described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise; and h) no specific sequence of acts or steps is intended to be required unless specifically indicated.

What is claimed is:

1. A mobile device comprising:
a housing having a plurality of surfaces, the housing being fabricated without vent holes;
a processor located within the housing, a portion of at least one of the plurality of surfaces of the housing conducting heat away from the processor, wherein the portion corresponds to an area of the at least one surface having the highest temperature;
a first temperature sensor thermally coupled to the processor for detecting a temperature of the processor;
a battery located within the housing and electrically coupled to the processor;
a second temperature sensor thermally coupled to the battery for detecting a temperature of the battery; and
a third temperature sensor thermally coupled to the portion, the third temperature sensor detecting a temperature of the portion, the rate of energy consumption by the processor being adjusted based on the temperatures of the processor, the battery and the portion.

2. The mobile device of claim 1 wherein the rate of energy consumption by the processor is adjusted by modifying at least one of a duty cycle of the processor, a clock speed of the processor and a voltage supplied to the processor.

3. The mobile device of claim 1 further comprising a control loop for continually adjusting the rate of energy consumption by the processor based on a thermal characterization of the mobile device.

4. The mobile device of claim 1 wherein at least one of the plurality of surfaces is thermally conductive.

5. The mobile device of claim 4 wherein the thermally conductive surface conducts heat from the processor.

6. A method comprising:
positioning a processor within a housing of a mobile device having a plurality of surfaces, the housing being fabricated without vent holes;
detecting a temperature of the processor;

positioning a battery within the housing and electrically coupling the battery to the processor;

detecting a temperature of the battery;

conducting heat away from the processor to a portion of at least one of the plurality of surfaces of the housing, wherein the portion corresponds to an area of the at least one surface having the highest temperature;

detecting a temperature of the portion; and adjusting the rate of energy consumption by the processor based on the temperatures of the processor, the battery and the portion.

7. The method of claim 6 wherein the rate of energy consumption by the processor is adjusted by modifying at least one of a duty cycle of the processor, a clock speed of the processor and a voltage supplied to the processor.

8. The method of claim 6 further comprising continually adjusting the rate of energy consumption by the processor based on a thermal characterization of the mobile device.

9. The method of claim 6 further comprising conducting heat from the processor with at least one of the plurality of surfaces.

10. A mobile device comprising:

a housing having a surface, the housing being fabricated without vent holes;

a processor located within the housing, a portion of surface of the housing conducting heat away from the processor, wherein the portion corresponds to an area of the surface having the highest temperature;

means for activating the processor;

means for detecting a temperature of the processor;

a battery located within the housing and electrically coupled to the processor;

means for detecting a temperature of the battery; and means for detecting a temperature of the portion of the surface, the rate of energy consumption by the processor being adjusted based on the detected temperatures of the processor, the battery and the portion.

11. The mobile device of claim 10 wherein the rate of energy consumption by the processor is adjusted by modifying at least one of a duty cycle of the processor, a clock speed of the processor and a voltage supplied to the processor.

\* \* \* \* \*